US008680423B2

(12) United States Patent
Binder et al.

(10) Patent No.: US 8,680,423 B2
(45) Date of Patent: Mar. 25, 2014

(54) SPOT WELDING GUN AND METHOD FOR ADJUSTING THE PRESSURE OF A SPOT WELDING GUN

(75) Inventors: Manuel Binder, Kallham (AT); Walter Stieglbauer, Manning (AT); Günter Weigerstorfer, Sipbachzell (AT)

(73) Assignee: Fronius International GmbH, Pettenbach (AT)

( * ) Notice: Subject to any disclaimer, the term of this patent is extended or adjusted under 35 U.S.C. 154(b) by 1863 days.

(21) Appl. No.: 11/663,490

(22) PCT Filed: Oct. 19, 2005

(86) PCT No.: PCT/AT2005/000415
§ 371 (c)(1),
(2), (4) Date: Mar. 22, 2007

(87) PCT Pub. No.: WO2006/042354
PCT Pub. Date: Apr. 27, 2006

(65) Prior Publication Data
US 2008/0078748 A1 Apr. 3, 2008

(30) Foreign Application Priority Data
Oct. 19, 2004 (AT) .................. A 1753/2004

(51) Int. Cl.
B23K 11/11 (2006.01)
(52) U.S. Cl.
USPC .......................................................... 219/90
(58) Field of Classification Search
USPC ............ 219/86.1, 86.21, 86.23–86.25, 86.33, 219/86.41, 89, 90, 99
See application file for complete search history.

(56) References Cited

U.S. PATENT DOCUMENTS 1,579,721 A * 4/1926 Freeland .................... 219/86.25
5,412,172 A * 5/1995 Ichikawa et al. ........... 219/86.41
(Continued)

FOREIGN PATENT DOCUMENTS

EP 761 367 B1 3/1997
EP 1 078 708 A 2/2001
(Continued)

OTHER PUBLICATIONS

International Search Report.

*Primary Examiner* — Brian Jennison
(74) *Attorney, Agent, or Firm* — Collard & Roe, P.C.

(57) ABSTRACT

The invention relates to a spot welding rod for the resistance welding of workpieces, the rod comprising a drive, which displaces the pincer arms and is configured by a spur gear and a connecting rod that is connected to the gear, the spur gear being connected to one pincer arm and the connecting rod to the other pincer arm. The invention also relates to a method for adjusting the pressure of a spot welding rod of this type. The aim of the invention is to provide a spot welding rod of this type with a simple, compact, modular construction, whose drive requires minimum maintenance and which permits a high number of spot welds. To achieve this, the connecting rod is connected to the spur gear outside the center of the latter, in particular at a defined distance to the central axis of the spur gear by means of a bearing assembly, the latter executing a curved movement during the working operation. A compensation element for compensating workpieces of differing thicknesses is located between the connecting rod and the pincer arm.

22 Claims, 9 Drawing Sheets

(56) References Cited

U.S. PATENT DOCUMENTS

| | | | |
|---|---|---|---|
| 5,739,499 A * | 4/1998 | Suzio et al. | 219/90 |
| 5,750,953 A | 5/1998 | Sato et al. | |
| 6,252,193 B1 * | 6/2001 | Umeda | 219/90 |
| 6,596,958 B1 * | 7/2003 | Chase | 219/86.25 |

FOREIGN PATENT DOCUMENTS

| | | |
|---|---|---|
| EP | 1 380 378 A | 1/2004 |
| JP | 802 5057 | 1/1996 |
| JP | 09 248678 A | 9/1997 |
| JP | 10 026204 A | 1/1998 |

\* cited by examiner

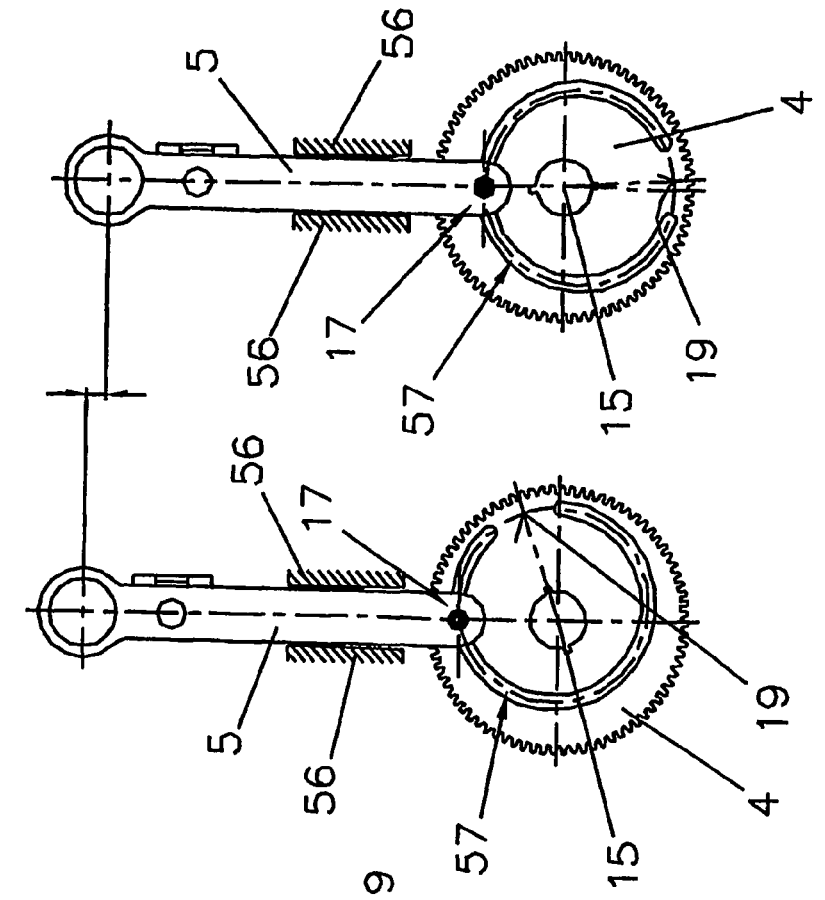

SPOT WELDING GUN AND METHOD FOR ADJUSTING THE PRESSURE OF A SPOT WELDING GUN

CROSS REFERENCE TO RELATED APPLICATIONS

Applicants claim priority under 35 U.S.C. §119 of Austrian Application No. A 1753/2004 filed Oct. 19, 2004. Applicants also claim priority under 35 U.S.C. §365 of PCT/AT2005/000415 filed Oct. 19, 2005. The international application under PCT article 21(2) was not published in English.

The invention relates to a spot welding gun for the resistance-welding of workpieces, in particular sheet metals, including a drive for moving the welding gun arms, which drive is formed by a spur wheel and a connecting rod connected with the spur wheel outside the central axis of the same via a bearing assembly, wherein the spur wheel is connected to a gun arm and the connecting rod is connected with the other gun arm on the opposite side of the spur wheel, the bearing assembly performing a curvilinear movement during operation.

The invention further relates to a method for adjusting the pressure of a spot welding gun, wherein at least one electrode of a welding gun arm is moved in the direction of the workpieces to be joined, wherein the drive, via a spur wheel and a connecting rod mounted thereon, actuates the gun arm carrying the electrode and, after the electrode has contacted the workpieces, a pressure is built up on the workpieces, by further actuating the drive, via the gun arm and the electrode arranged thereon, said pressure being detected by a sensor and the data of the sensor being transmitted to a control device, whereby, upon attainment of a predetermined pressure value, the drive is controlled by the control device in a manner as to maintain said pressure, whereupon spot welding is carried out and the electrode is moved back after spot welding has been completed.

The invention, in particular, relates to spot welding guns as are employed for robotic applications.

From JP 8025057 as well as EP 761 367 B1, a drive for spot welding guns is known, in which the gun arms of the spot welding gun are opened and closed by the aid of a so-called crank assembly. There, a gun arm is directly fastened to a crank wheel which is driven by a motor through a V-belt. The other gun arm is immovable, i.e. rigidly arranged on a holding means. As the crank wheel is being driven by the motor, the gun arm arranged on the crank wheel performs an opening and closing movement, thus causing the electrodes provided on the gun arm to move towards each other and away from each other. In doing so, no compensation of the different possible component thicknesses occurs, for which reason it is necessary to dimension the drive motor so generously as to contain sufficient power reserves even for the maximally weldable component thickness in order to attain a preadjusted power value.

JP 9248678 A and EP 1 078 708 A disclose spot welding guns each comprising a drive formed by a wheel and a connecting rod connected with the same. The wheel is connected to one gun arm, and the connecting rod, on the opposite side, is connected with the other gun arm, the connecting rod being connected with the wheel eccentrically of the latter via a bearing assembly. As a result, different pressure conditions will occur with different workpieces and, in particular, differently thick workpieces during the spot welding procedure.

The object of the present invention, therefore, consists in the provision of an above-identified spot welding gun which is designed in a modular, simple and compact manner and comprises a drive that is subject to as little maintenance as possible while, at the same time, ensuring as high a number of working cycles, i.e. spot weldings, as possible. Drawbacks of the prior art are to be avoided or at least reduced.

A further object of the present invention resides in the provision of an above-mentioned method for building up the pressure of a spot welding gun that functions as simply as possible and requires as little maintenance as possible while ensuring as high a number of working cycles as possible.

The objects according to the invention are achieved by an above-defined spot welding gun which comprises an element arranged between the connecting rod and the gun arm to compensate for different thicknesses of the workpieces to be welded. The compensation element according to the invention enables different workpieces of different materials and different thicknesses to be optimally welded by causing an optimum pressure adjustment as a function of the workpieces to be welded. Furthermore, it is achieved in an advantageous manner that a nearly maintenance-free drive with as little friction as possible is provided, which has small and compact structural dimensions. Furthermore, a substantially increased number of working cycles has become feasible without replacement of worn parts. It is, moreover, advantageous that a drive with an optimum power build-up is provided so as to require only a small, light-weight and low-output motor for the drive, thus again substantially minimizing the structural dimensions of the drive as well as the costs involved.

If a toothing is provided about the circumference of the spur wheel, which is engaged by a toothed wheel coupled to a gear and/or motor, a motor driving the spur wheel can be directly arranged on the spur wheel, or periphery of the spur wheel, so as to provide a simple transmission. Besides, this will require a substantially lower-output motor, since the spur wheel can be rotated the more easily the farther away the motor from the center of the spur wheel. Substantial cost savings for the drive and, hence, the spot welding gun will, thus, be achieved.

If the compensation element is arranged on one of the gun arms, an optimum and always identical pressure adjustment, i.e. an optimum and equal pressure build-up of the electrodes on the workpiece, will be obtained. It is, thus, feasible in a simple manner to provide an automatic pressure adjustment without any necessary changes by the user.

Advantageously, a pivot arm is each arranged on the two gun arms, which pivot arms are connected with each other on the sides opposite the gun arms, for instance by a pin having an axis of rotation. Thus, a spot welding gun of simple and uncomplicated structure is provided, which offers good accessibility to the workpieces. In addition, this allows for a substantial reduction of weight so as to again provide a substantial minimization of costs.

Advantageously, the pivot arms are each arranged at a defined distance relative to the drive and/or the electrodes.

According to a further characteristic feature of the invention, the compensation element, or a casing or shields of the compensation element, are rigidly arranged on the gun arm.

Advantageously, the compensation element is comprised of a casing including an eccentric shaft movably mounted in a bearing, as well as a blocking means.

Compensation is effected via the eccentric shaft in that the eccentric shaft is rotated to a defined point and the pressure build-up takes place only after the fixation of the eccentric shaft in that point. Path compensation is, thus, realised by simple means.

According to a further characteristic feature of the invention, it is provided that a blocking means is arranged on the casing of the compensation element, which blocking means comprises a cylindrical projection, wherein the eccentric shaft is inserted in a passage opening of the cylindrical projection.

By arranging a fixing means on the eccentric shaft to connect the eccentric shaft with the blocking means, a simple fixation can be realized. By arranging a readjusting element, which is preferably designed as a spring, on the projection, a defined readjustment to the starting position of the eccentric shaft can be provided in a simple manner. It is, thus, avoided that the eccentric shaft will be perpendicular to the connecting rod arranged on the eccentric shaft and, hence, prevent a path compensation, since the eccentric shaft would not be rotatable merely by applying the closing force.

According to a further characteristic feature of the invention, the blocking means is designed as a magnetic brake. Such a blocking means is particularly quick in its reaction so as to prevent in a simple manner delays, and hence resulting inaccuracies, in the pressure build-up.

The provision of a manual adjustability of the compensation element by using, for instance, a perforated disc, allows for an easy adjustment of the thicknesses of the workpieces to be welded. Parts required for an automatic pressure compensation, such as, for instance, a controllable locking device, will thus be saved, and the drive will thus become substantially cheaper and also lighter.

In method terms, the object according to the invention is achieved in that, during the movement of the electrode in the direction of the workpieces, a pressure and/or path compensation is effected via a compensation element arranged between the connecting rod and the gun arm, by the sensor detecting a position of the spur wheel and/or motor and the compensation element being blocked when reaching a defined position located preferably near an upper dead center of the spur wheel, thus effecting a pressure build-up of the electrodes on the work-pieces. In doing so, it is advantageous that the pressure build-up of the electrodes on the workpiece takes place only immediately before the upper dead center of the spur wheel, or connection site of the spur wheel with the connecting rod. Since the pressure build-up immediately before the upper dead center is substantially more easily feasible than with the connection site located at a right angle relative to the upper dead center, a substantially lower-output motor can be used to drive the spur wheel. It is, moreover, advantageous that the structural dimensions and weight of the spot welding gun can, thus, be kept substantially smaller in a simple manner.

Due to the fact that the spur wheel and/or the motor, when reaching a defined pressure of the electrode on the workpieces, keep their positions, it will be feasible to maintain the application pressure of the electrode on the workpieces during the spot welding process.

According to a further characteristic feature of the invention, the pressure or path compensation is effected using a mechanically constructed compensation element, by blocking the compensation element for any further pressure build-up when reaching a mechanically fixable position. A simple and cost-effective construction of the compensation element will, thus, be achieved. Also a considerable reduction of weight will be feasible for the spot welding gun.

Prior to the beginning of the spot welding procedure, the spot welding gun is opened and the reference position of the spur wheel is determined by the aid of the sensor.

It can thereby be safeguarded that, at a predetermined position of the spur wheel and/or the motor, a blockage of the compensation element for the pressure build-up will take place and/or a transgression of the upper dead center will be prevented. The drive and, in particular the spur wheel and/or the motor will, thus, be referenced in a simple manner, i.e. an end and/or reference position will be detected.

According to a further characteristic feature of the invention, the electrodes are moved towards each other until contacting the workpiece. After this, the spur wheel is rotated further, yet the pressure exerted by the electrodes on the workpieces is no longer built up via the compensation element by an eccentric shaft mounted in the compensation element being rotated about an axis upon contact with the workpieces, the eccentric shaft being blocked in its direction of rotation when reaching the defined position of the spur wheel such that a further pressure build-up of the electrodes on the workpieces will be effected. This enables in a simple and cost-effective manner the automatic pressure build-up at the desired point of time, which again renders feasible the use of a smaller, lower-output and, hence, cheaper motor and/or motor-transmission combination and, in addition, a substantial reduction of the overall weight and costs of the spot welding gun.

Advantageously, the built-up pressure is detected by a pressure recognition means arranged on a connecting rod and/or on the gun arm.

In this case, a pressure detection can be performed via the deformation of the connecting rod and/or the gun arm, for instance by using a strain gauge. This enables the subsequent regulation of the pressure force and the automatic adaptation of the pressure exerted by the electrodes on the workpieces.

The present invention will be explained in more detail by way of the annexed drawings. Therein:

FIG. 1 schematically illustrates in a simplified manner a perspective view of a spot welding gun including a drive according to the invention in the starting position;

Figure 5:
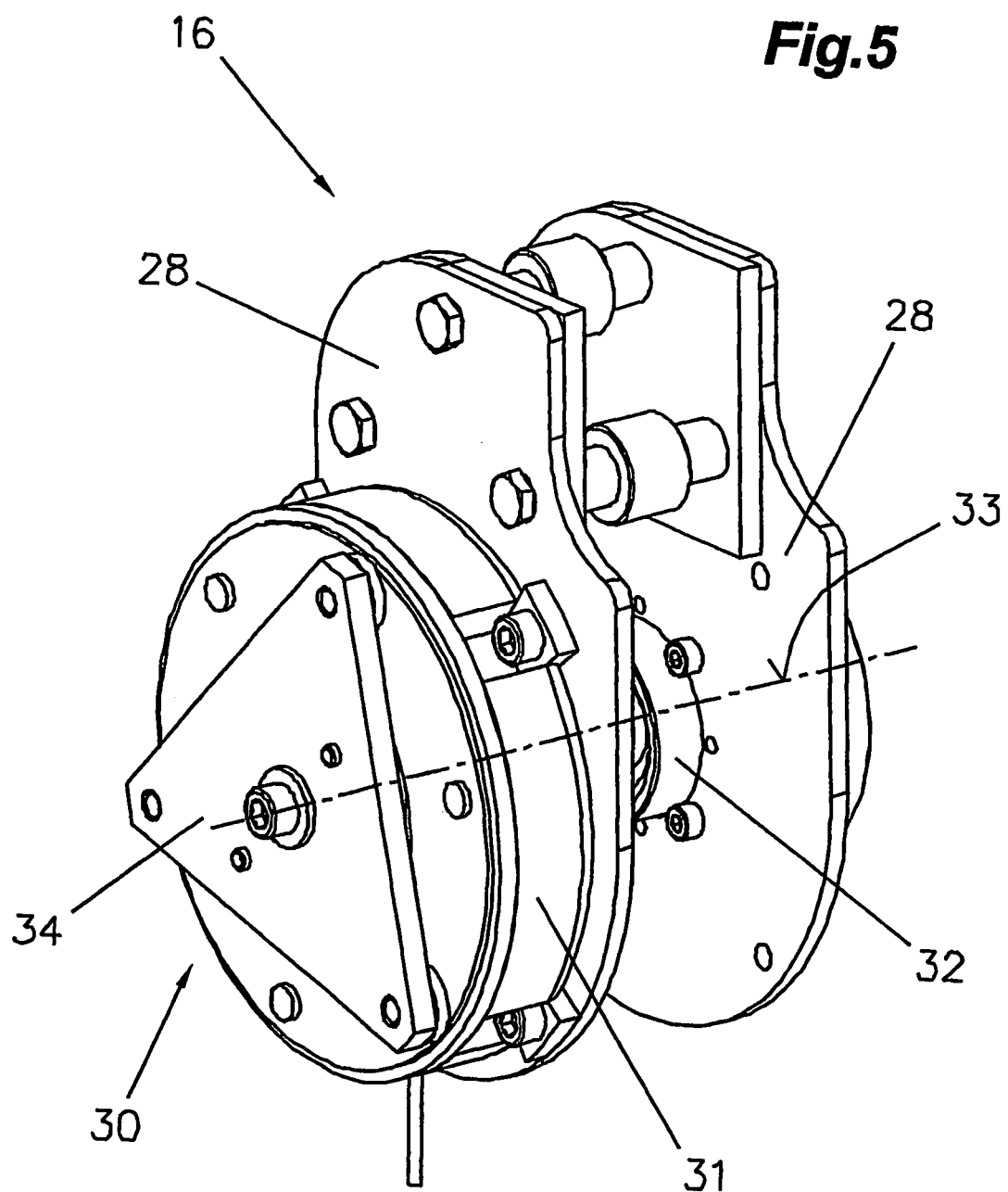
Figure 6:
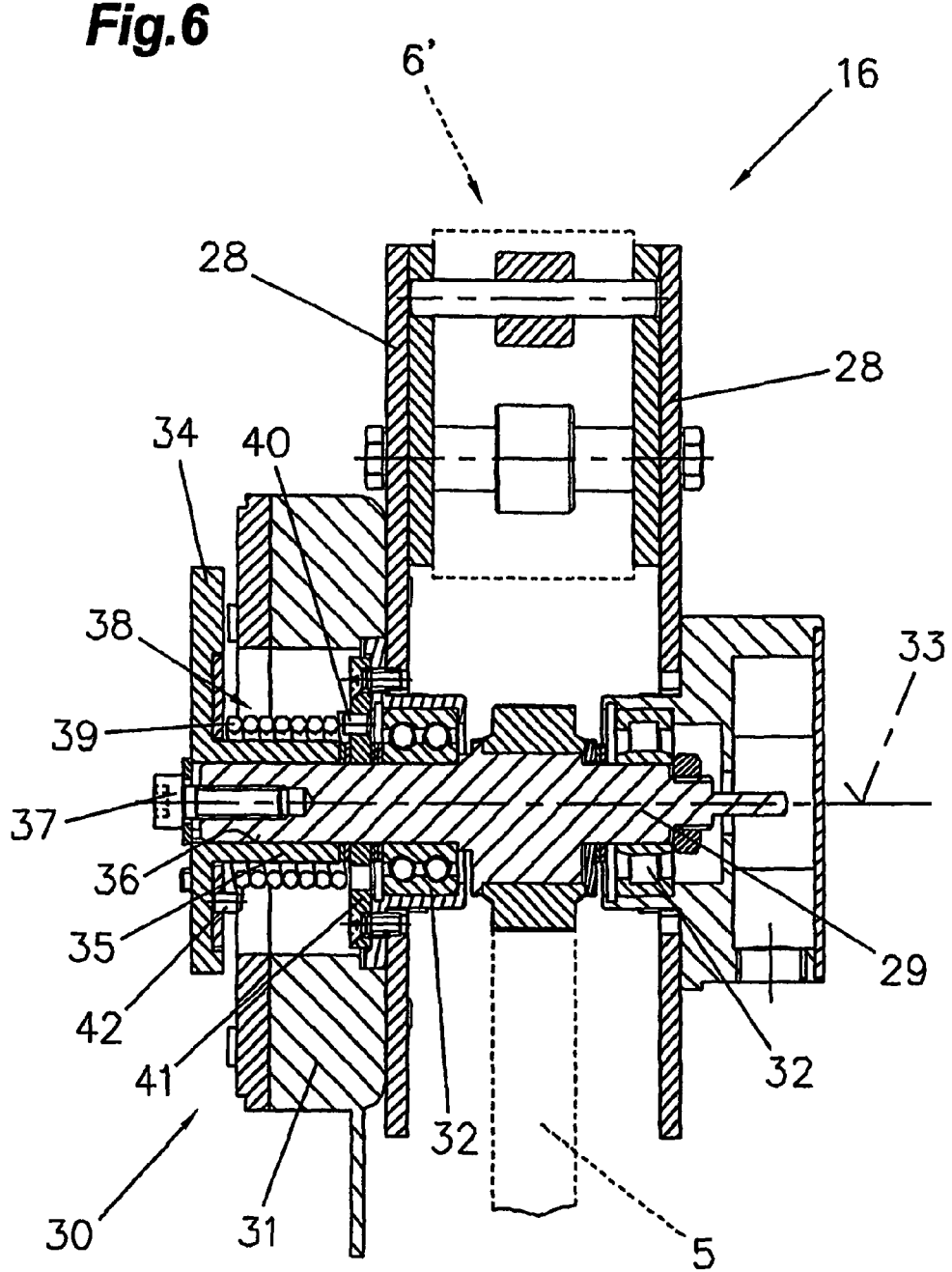
Figure 7:
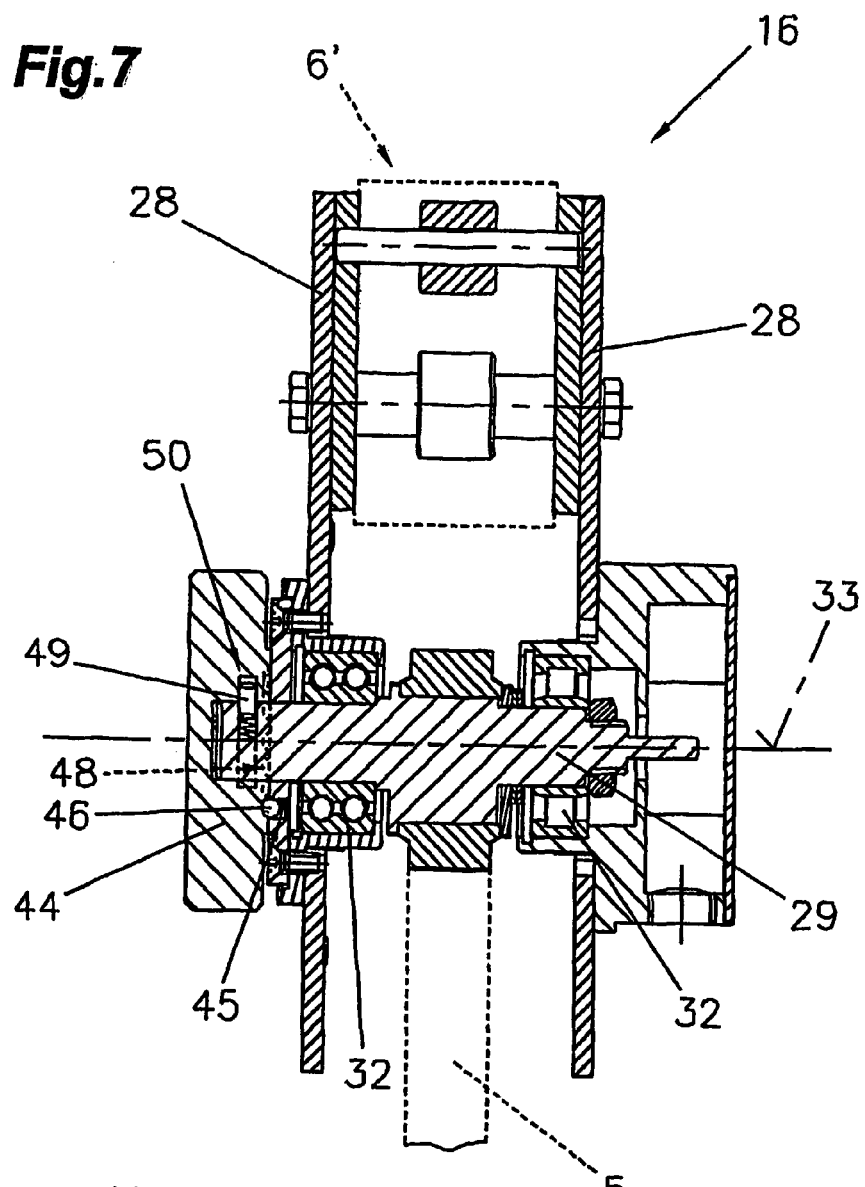
Figure 8:
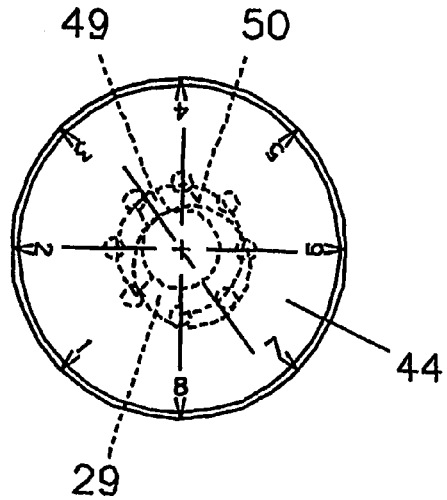
Figure 10:
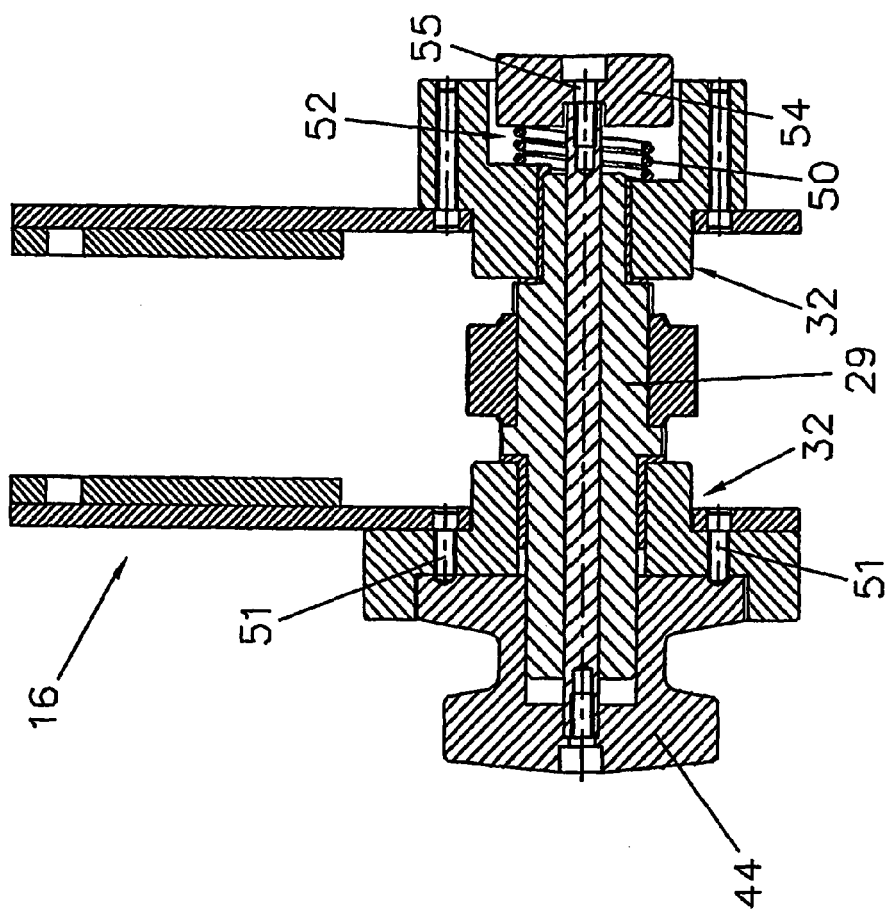
Figure 9:
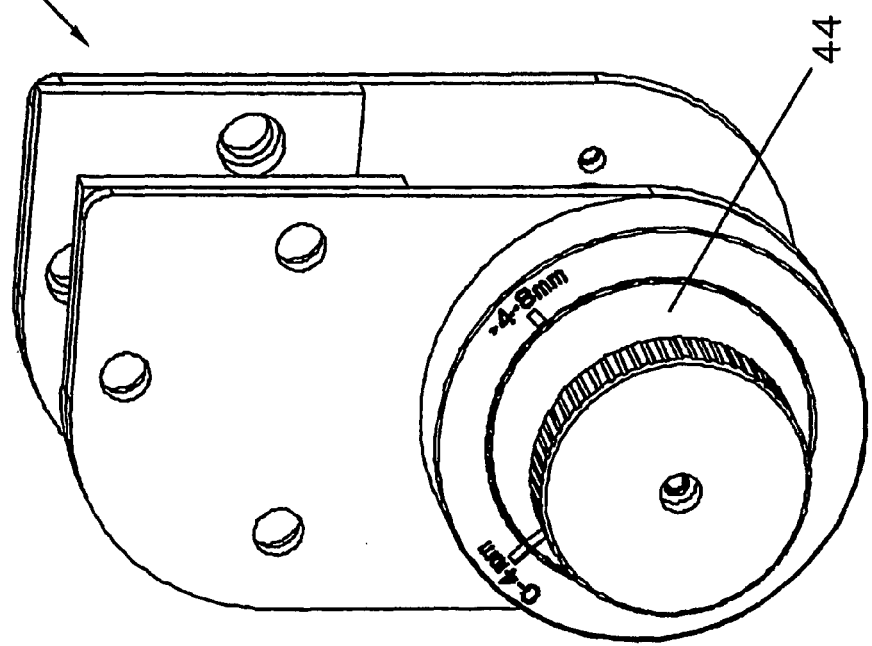

FIG. 5 schematically illustrates in a simplified manner a perspective view of the compensation element according to the invention;

FIG. 6 is a sectional view of the compensation element according to FIG. 5;

FIG. 7 is a sectional illustration of a variant embodiment of the compensation element;

FIG. 8 is a view of a perforated disc of the compensation element;

FIG. 9 schematically illustrates in a simplified manner a perspective view of a further variant embodiment of the compensation element;

FIG. 10 is a sectional illustration of the compensation element according to FIG. 9;

FIG. 11 is a schematic, simplified representation of the drive comprised of a spur wheel and a connecting rod, in the operating position;

FIG. 12 depicts the drive according to FIG. 11 during the opening of the spot welding gun;

FIG. 13 illustrates a variant embodiment of the drive comprised of a spur wheel and a connecting rod, in the operating position, and FIG. 14 depicts the drive according to FIG. 13 with the spot welding gun opened.

In FIGS. 1 to 4, a spot welding gun 2 including a drive 1 is schematically illustrated in a simplified manner. The spot welding gun 2 is, for instance, designed for robotic applications and used for the resistance-welding of workpieces 3, 3' and, in particular, sheet metals.

The drive 1 is comprised of a spur wheel 4 and a connecting rod 5, the spur wheel 4 being connected to a welding gun arm 6 and the connecting rod 5 being connected with the other welding gun arm 6' of the spot welding gun 2 on the opposite side of the spur wheel 4 via a compensation element 16. One pivot arm 7, 7' is each arranged on a gun arm 6, 6'. The pivot arms 7, 7' are interconnected by a pin 8 forming an axis of rotation 9 so as to provide in a simple manner a bearing means for the two pivot arms 7, 7' and, hence, mount the two gun arms 6, 6' in a mutually rotational manner such that a so-called X-gun is formed. The pivot arms 7, 7' are connected with the gun arms 6, 6' at a defined distance relative to the drive 1 and/or the electrodes 11, 11'. The pivot arm 7, 7' is, thus, arranged at a defined distance relative to one of the two ends of the respective gun arms 6, 6'. On the side of the gun arm 6, 6' located opposite the drive 1, an electrode holder 10, 10' carrying the electrode 11, 11', respectively, is each arranged. By the aid of the drive 1, which is preferably arranged in the opposite end region of the gun arms 6, 6' relative to the electrodes 11, 11' fastened in the other end region of the gun arms 6, 6', an opening and closing movement, i.e. the opening and closing of the gun arms 6, 6' and hence the electrodes 11, 11', is carried out via the axis of rotation 9. The axis of rotation 9 of the pin 8 constitutes the main rotational axis of the spot welding gun 2.

The connecting rod 5 is arranged outside the center of the spur wheel 4, in particular at a defined distance from the central axis 15 of the spur wheel 4, and connected with the latter via a bearing assembly 17. The bearing assembly 17, i.e. the connection site of the connecting rod 5 with the spur wheel 4, performs a curvilinear movement upon actuation of the spot welding gun 2, i.e. at an operating cycle. This again provides in a simple manner a substantial reduction of the required performance of the motor 13, or motor-transmission combination, driving the spur wheel 4 to build up the pressure exerted by the electrodes 11, 11' on the workpieces 3, 3'.

A compensation element 16 may be provided as a connection link between the connecting rod 5 and the gun arm 6' of the spot welding gun 2. The compensation element 16 is arranged on one gun arm 6' and the spur wheel 4 is arranged on the other gun arm 6. The connecting rod 5 is mounted on the compensation element 16 and on the spur wheel 4, eccentrically of the latter. The compensation element 16 serves to allow the build-up of force to always take place in the optimum range of the drive 1 independently of the respective sheet metal thicknesses of the workpieces 3, 3' to be welded. In doing so, a rotation of the spur wheel 4 occurs almost forcelessly as far as to a pre-determined region, whereupon the compensation element 16 is subsequently blocked so as to prevent the spur wheel 4 from being forcelessly rotated any further, whereby a pressure build-up can be effected. Consequently, a substantially smaller, lighter and lower-output motor 13 can be employed for the drive 1, since the pressure build-up will always occur only in the optimum adjustment range.

In order to determine and, in particular, monitor the actual pressure build-up, or force exerted by the electrodes 11, 11' on the workpiece 3, a means 47 for the recognition of the built-up force is, for instance, arranged on a gun arm 6, 6' and/or on the connecting rod 5. The recognition means 47 can, for instance, be designed as a strain gauge which takes up a deformation of the gun arm 6', or of the connecting rod 5, resulting from the exertion of force on the gun arm 6'.

Figure 1:
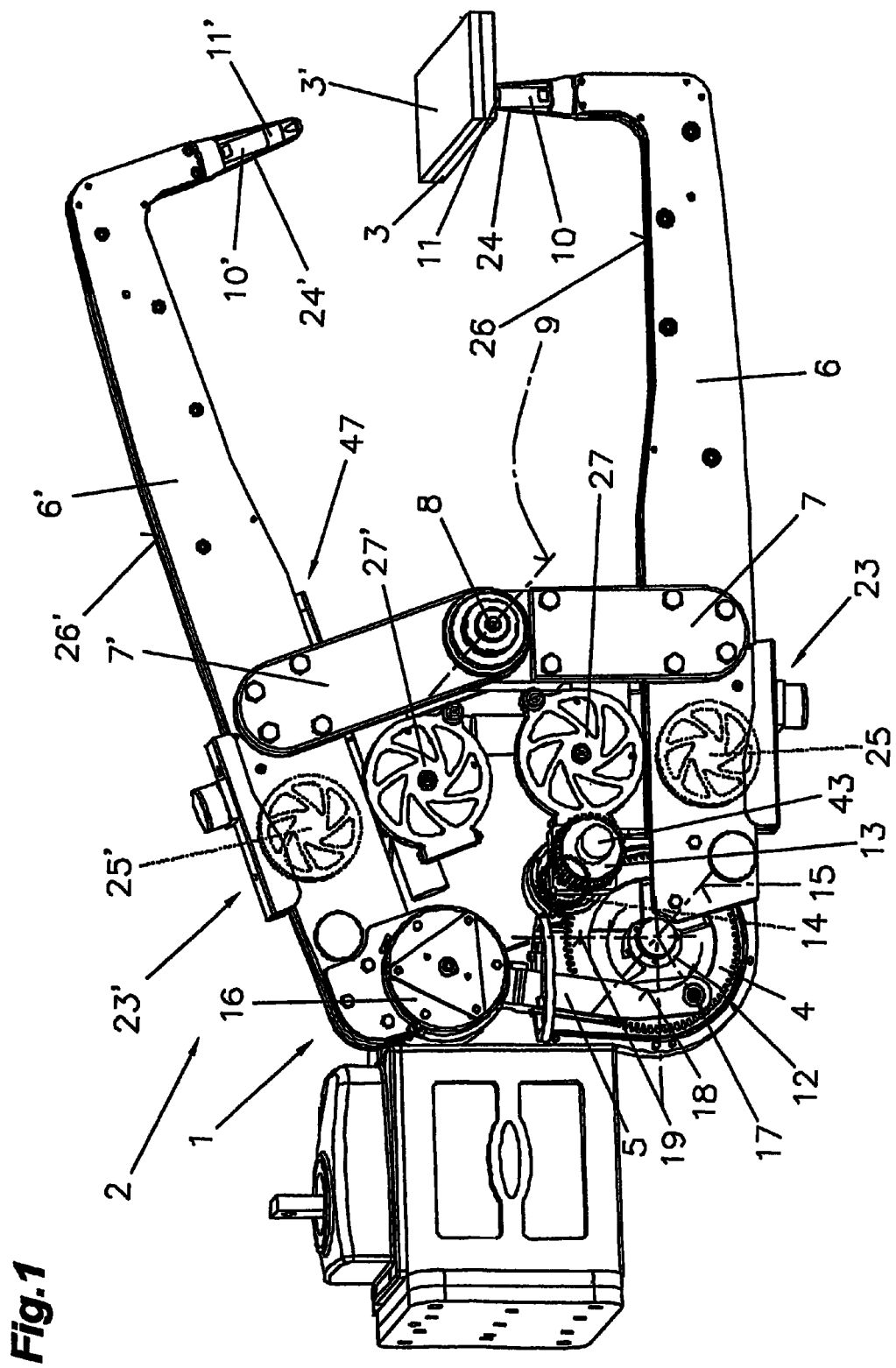
Figure 2:
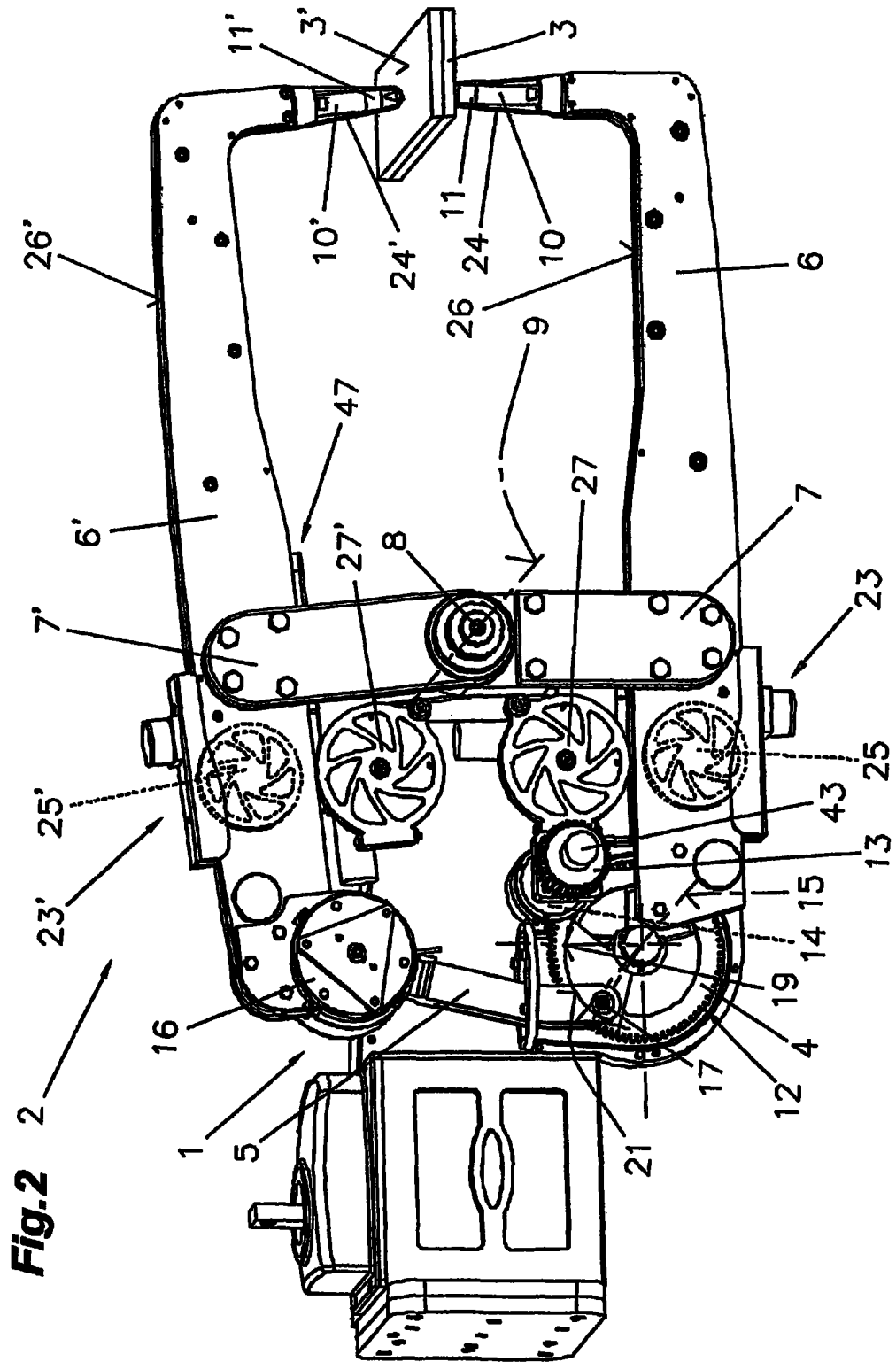
FIG. 2 illustrates the spot welding gun according to FIG. 1 in contact with a workpiece.
Figure 3:
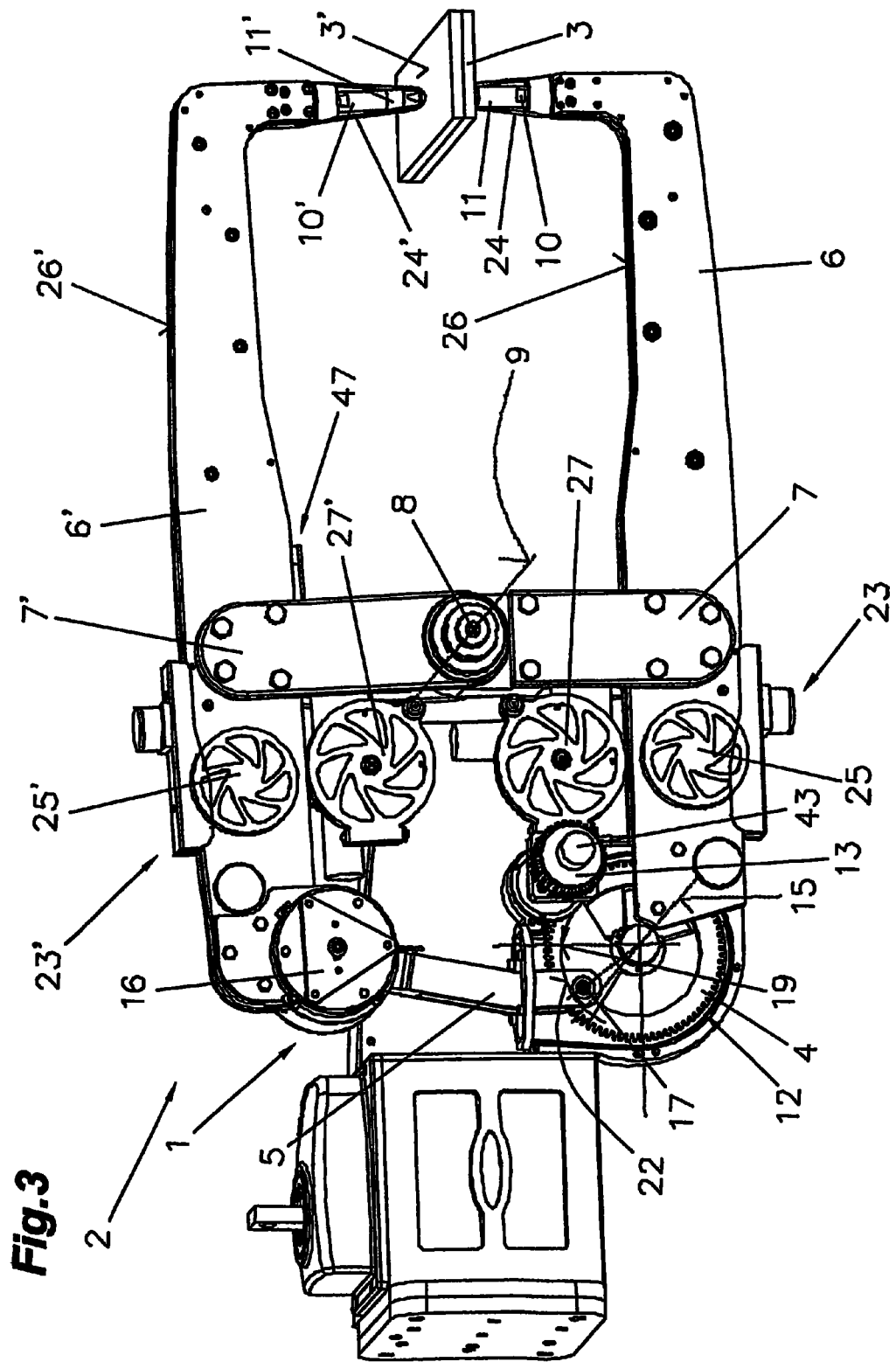
FIG. 3 illustrates the spot welding gun according to FIG. 1 during a path compensation or compensation movement, i.e. with the compensation element activated.
Figure 4:
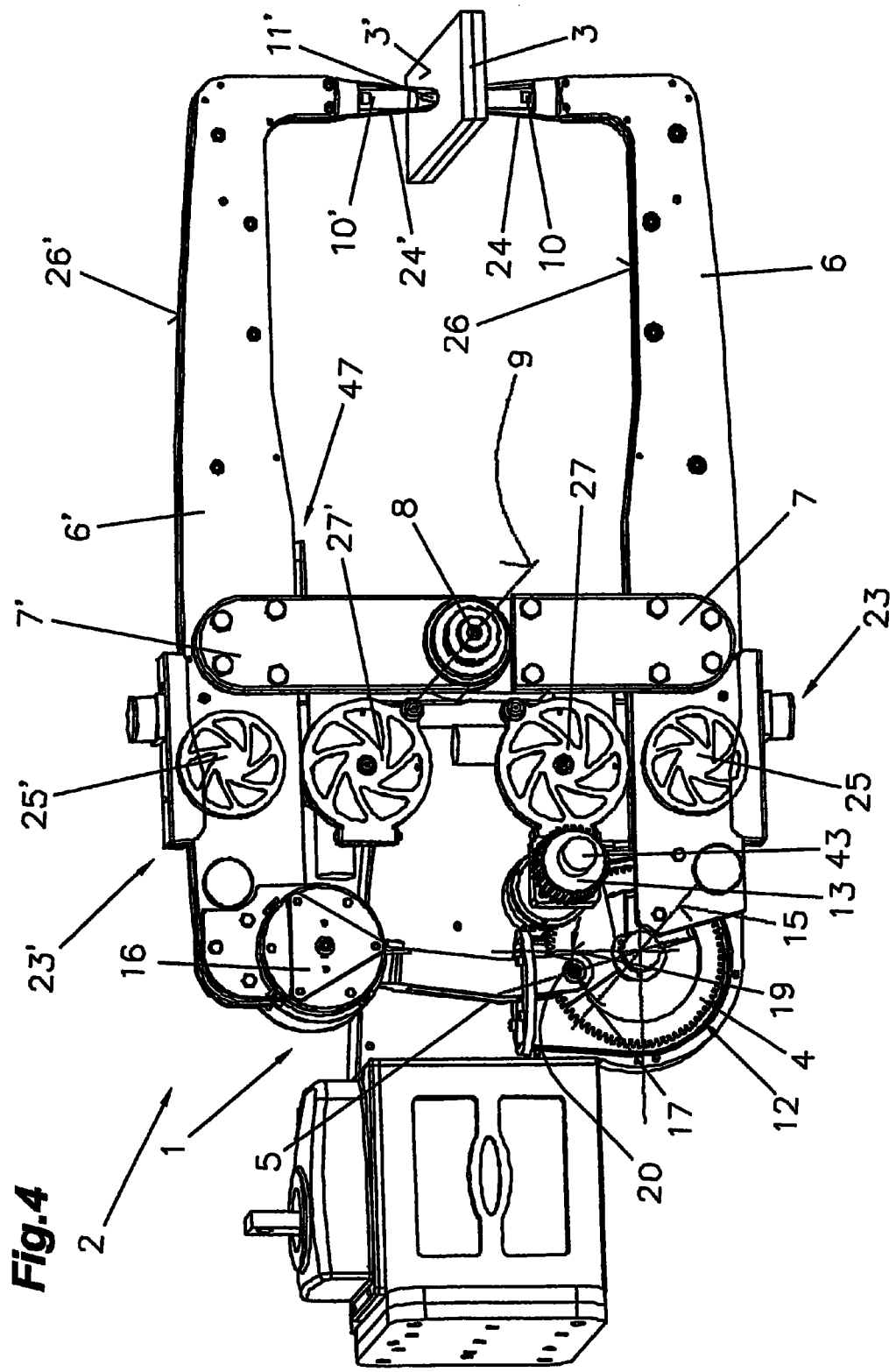
FIG. 4 depicts the spot welding gun according to FIG. 1 in the operating position.

FIG. 1 shows the spot welding gun 2 with the drive 1 according to the invention in the opened state, i.e. in a starting position, while FIGS. 2, 3 and 4 depict the individual operating steps of the spot welding gun 2 according to FIG. 1. FIG. 2 shows the spot welding gun 2 with the electrodes 11, 11' moved together into contact with the workpieces 3, 3', i.e. in the closed state. In FIG. 3, the spur wheel 4 has been further rotated as compared to the illustration according to FIG. 2, yet the compensation element 16 prevents any further pressure build-up of the electrodes 11, 11' on the workpieces 3, 3'. Thus, the connecting rod 5 and the spur wheel 4 are moved almost forcelessly. FIG. 4 shows the spot welding gun 2 in the operating position, i.e. with an application pressure built up by the electrodes 11, 11' on the workpieces 3, 3', which is necessary for the spot welding process. In this case, the compensation element 16 allows for the build-up of pressure from a defined point of time, or a defined position of the spur wheel 4 or bearing assembly 17, in order to reach the pressure to be exerted by the electrodes 11, 11' on the workpieces 3, 3' for the spot welding process. It is now feasible to carry out the spot welding process, with the pressure exerted by the spot welding gun 2 on the workpieces 3, 3' being maintained during the spot welding process. After the spot welding process, the gun arms 6, 6' are again moved back into the opened starting position according to FIG. 1.

For the driving of the spur wheel r, the latter comprises a toothing 12 about its periphery in the exemplary embodiment illustrated. A toothed wheel 14 coupled with a gear and/or the motor 13 engages in this toothing 12. The toothed wheel 14 is slipped on a shaft of the gear and/or motor 13 and connected with the former in a rotationally fast manner. The drive 1 for the gun arm 6' is, thus, comprised of the spur wheel 4, the connecting rod 5 fastened thereto, the motor 13 and/or a gear, and a toothed wheel 14 fastened to the latter or to a shaft. When the motor 13 is activated, the toothed wheel 14 will, thus, move the spur wheel 4 about its central axis 15. As opposed to the prior art, the drive 1 requires a substantially lower-output motor 13 because of a transmission of the motor power, or torque of the motor 13, onto the spur wheel 4 being provided. The drive 1 is configured in a manner as to allow the building up of pressure only over a predetermined, optimum displacement path, over which as little force as possible is required.

Naturally, the spur wheel 4 can also be driven in any other manner. The motor 13 may, for instance, be directly arranged on the spur wheel 4, i.e. axially to the central axis 15, and rigidly coupled with the same, for instance, by a shaft. It is also feasible to drive the spur wheel 4 by means of a V-belt extending from the shaft of the gear and/or motor 13 to a shaft of the spur wheel 4. The V-belt may also extend about the circumference of the spur wheel 4. In those variant embodiments, a substantially larger and stronger motor, or a larger motor-gear combination, would, however, be required to realize the same build-up of force.

The compensation element 16 on the connection site between the connecting rod 5 and the gun arm 6' serves to compensate for differently thick workpieces 3, 3'. The spur wheel 4, and the bearing assembly 17, i.e. the connection site between the connecting rod 5 and the spur wheel 4, are in the resting position at a defined angle 18 relative to an upper dead center 19 of the spur wheel 4, as is apparent from FIG. 1. In order to obtain an optimum pressure build-up of the electrodes 11 on the workpieces 3, 3' at a minimum force expenditure, the pressure build-up should ideally be started shortly before the upper dead center 19 as a function of the angle 22 (FIG. 3) of the bearing assembly 17. The upper dead center 19 is that point at which the bearing assembly 17 reaches the highest point on the spur wheel 4.

The compensation element 16 then controls the pressure build-up in a manner that the gun arms 6, 6', i.e. the electrodes 11, 11', are moved to each other until contacting the workpieces 3, 3', with the bearing assembly 17 of the spur wheel 4 enclosing an angle 21 relative to the upper dead center 19. The spur wheel 4 is moved on in the direction of the upper dead center 19, yet no pressure build-up of the electrodes 11, 11' onto the workpieces 3, 3' occurs. As soon as the angle 22 (cf. FIG. 3) has been reached, i.e. the bearing assembly 17 has arrived closely before the upper dead center 19, the compensation element 16 is activated, and the pressure build-up takes place until the spur wheel 4 has reached a position immediately before the upper dead center 19 in correspondence with the angle 20 (FIG. 4) so as to safely prevent an overswing of the upper dead center 19.

In the immediate vicinity of the spur wheel 4, a sensor 43 may be arranged to detect the position of the spur wheel 4. In the exemplary embodiment illustrated, the sensor 43 is arranged on the motor 13 and designed as an encoder. The sensor 43 detects the revolutions of the motor 13 and passes them on to a control device (not illustrated) of the spot welding gun 2. Based on the values detected by the sensor 43, the control device calculates the position of the spur wheel 4 and of the position of the bearing assembly 17, respectively, and/or further controls the compensation element 16. An automatic and simple compensation of different material thicknesses of the workpieces 3, 3' is thus provided.

Prior to the beginning of the spot welding process, i.e. at the first activation of the spot welding gun 2, for instance at the beginning of operation, the position of the spur wheel 4 has to be determined. It is, for instance, feasible to fix a reference position of the spur wheel 4. To this end, it will do to move the spur wheel 4 to an end position, which is detected by the sensor 43, and to subsequently determine the movement and, hence, the position of the spur wheel 4. From that point, the control device will control the other positions of the spur wheel 4 during the spot welding process. Furthermore, the sensor 43 detects the actual position of the spur wheel 4 at any possible or necessary point of time and transmits the actual position of the spur wheel 4 to the control device.

The spot welding gun 2 may also comprise a winding means 23, 23', via which strips 24, 24' are pulled over the electrodes 11, 11'. They serve to protect the electrodes 11, 11' during the spot welding process so as to substantially reduce the wear of the electrodes 11, 11' in an advantageous manner. The strips 24, 24' are guided from wind-off rollers 25, 25' of the winding means 23, 23' via guides 26, 26' of the gun arms 6, 6' to the electrodes 11, 11' and, on the opposite side of the gun arms 6, 6', back to the wind-up rollers 27, 27' of the winding means 23, 23'. The winding means 23, 23' may be arranged on the gun arm 6, 6' between the drive 1 and the pivot arm 7, 7'. The guides 26, 26' may be incorporated in the gun arms 6, 6' or formed by passages provided on the gun arms 6, 6'. Instead of using the wind-off rollers 25, 25', it is also feasible to merely insert coiled-up strips 24, 24' contained in cassettes. The simple exchange of the cassettes or strips 24, 24' is thereby enabled.

FIGS. 5 and 6 depict the compensation element 16 according to the invention, which is comprised of shields or plates or a casing 28 including a bearing for an eccentric shaft 29, the eccentric shaft 29 and a blocking means 30. The casing 28 in the exemplary embodiment illustrated consists of two parts. The blocking means 30 in the exemplary embodiment illustrated is designed as a magnetic brake 31. The compensation element 16 in this case is rigidly arranged on the gun arm 6' via the casing 28.

The eccentric shaft 29 is arranged in at least one bearing 32 so as to be movable about an axis 33 of the eccentric shaft 29. Furthermore, a blocking element 34 including a cylindrical projection 35 is arranged on the casing 28. The eccentric shaft 29 is inserted in a passage opening 36 of the cylindrical projection 35 and connected with the blocking element 34 in a rotationally fast manner by the aid of a fastening means 37. The eccentric shaft 29 is, thus, rotated upon pressurization and blocked by the blocking means 30 at a predetermined point of time, or predetermined location, in particular from a defined position of the spur wheel 4 or bearing assembly 27. It is also possible to detect the position of the spur wheel 4 and/or the motor 13 by means of the sensor 43, whereupon the blockage of the compensation element 16 will occur upon attainment of a defined position of the spur wheel 4, i.e. when reaching a defined position, so as to achieve the initially described path compensation.

Therefore, when the electrodes 11, 11' are moved to each other until contacting the workpieces 3, 3' as in correspondence with FIG. 2, a counter-pressure is being built up from that point of time, which will cause the automatic rotation of the eccentric shaft 29. From the time of rotation of the eccentric shaft 29, the pressure exerted by the electrodes 11, 11' on the workpieces 3, 3' will, thus, no longer be increased. When the spur wheel 4 has reached a desired position, i.e. the bearing assembly 17 has reached the defined angle 20 relative to the upper dead center 19 as in correspondence with FIG. 4, the eccentric shaft 29 is blocked in its rotational movement by the blocking means 30, thus causing a further pressure build-up of the electrodes 11, 11' on the workpieces 3, 3'.

If, however, the eccentric shaft 29 were positioned in parallel with the connecting rod 5 at the onset of the spot welding process, i.e. the eccentric protrusion of the eccentric shaft 29 were oriented in the direction of the connecting rod 5, the eccentric shaft 29 would not carry out any automatic compensation movement, since it would be impossible to rotate the eccentric shaft 29 about the axis 33. To avoid this, and to keep the eccentric shaft 29 always in a starting position in which the eccentric shaft 29 is, for instance, positioned normally to the connecting rod 5, a readjusting element 38 may be provided. The readjusting element 38 may, for instance, be configured as a spring 39 or formed by any element known from the prior art and suitable for this purpose. The spring 39 is arranged on the projection 35 and biased between a first pin 40 arranged on a holding plate 41 and a second bolt 42 arranged on the blocking element 34. At a rotation of the eccentric shaft 29, the blocking element 34 is moved along with the former and the spring 39 is further tensioned by the pin 40 of the blocking element 34. At a pressure release, i.e. upon completion of the spot welding process, and opening of the spot welding gun, the spring 39 will act on the blocking element 34, thus forcing the eccentric shaft 29 back into its starting position. The repositioning of the eccentric shaft 29 is thereby provided in a simple manner so as to ensure a problem-free realization of the spot welding process including a path compensation.

The provision of the compensation element 16 allows for the use of a substantially lower-output motor 13 and/or gear or transmission. The eccentric shaft 29 is blocked only shortly before the upper dead center 19 of the spur wheel 4 as described in detail, since in that case substantially less energy will have to be applied as far as to the upper dead center 19 in order to reach a defined or desired pressure.

The adjustment of the application pressure exerted by the electrodes 11, 11' on the workpieces 3, 3' may, of course, be carried out manually, for instance by the aid of a perforated disc 44 arranged on the compensation element 16, as is apparent from FIG. 7. By rotating the perforated disc 44, it is, for instance, feasible to manually adjust the sheet metal thickness of the workpieces 3, 3' to be worked on. To this end, markings may be provided on the surface of the perforated disc 44 as in accordance with FIG. 8. The perforated disc 44 is rotated as a function of the sheet metal thickness. When reaching the desired marking, a ball 46 mounted on a spring 45 and arranged on the compensation element 16 will enter into engagement with an opening 48 provided below the marking so as to fix the perforated disc 44 in the respective position.

Further arranged on the eccentric shaft 29 is a pin 49, which is oriented towards the perforated disc 44 and engages in a groove 50 of the perforated disc 44. The groove 50 provided in the perforated disc 44 is configured such that the eccentric shaft 29 can only be rotated until the pin 49 has reached the end of the groove 50. The eccentric shaft 29, thus, rotates from the contact of the electrodes 11, 11' with the workpieces 3, 3' until the contact of the pin 49 with the end of the groove 50. At a further rotation of the spur wheel 4, the pressure build-up of the electrodes 11, 11' on the workpieces 3, 3' will then be started. The adjustment of the spot welding gun 2 is thus enabled in a simple and cost-effective manner.

FIGS. 9 and 10 illustrate a further exemplary embodiment of a manual adjustment option on the spot welding gun 2 for the workpieces 3, 3' to be treated. In this case, a perforated disc 44 is again arranged on the compensation element 16. The eccentric shaft 29 arranged in the compensation element 16 in this exemplary embodiment is, however, rigidly connected with the perforated disc 44. After having reached a mechanically fixable position, the blockage of the compensation element 16 will be effected, followed by a further pressure build-up.

The perforated disc 44 with the eccentric shaft 29 rigidly fastened to it is rotationally arranged on the compensation element 16 via a bearing 32. The perforated disc 44 has markings with current thicknesses of the materials to be welded. Thus, the compensation element 16 is adjusted, and a path adaptation is accordingly provided, by a rotation of the perforated disc 44 to the desired material thickness for the workpiece 3 to be welded. With thicker materials, the displacement path of the gun arms 6, 6' with the electrodes 11, 11' fastened thereto is substantially smaller, for which reason the pressure build-up on the workpieces 3, 3' has to be started earlier. Since, however, the spur wheel 4 is not yet near the upper dead center 19, more force will be required to build up the pressure necessary for spot welding.

Since the eccentric shaft 29 is rigidly connected with the perforated disc 44, the gun arm 6' with the attached electrode 11' is moved up and down by a defined path, i.e. opened and closed, through a rotation of the perforated disc 44. In the event of thinner workpieces 3, 3', this will cause the electrode 11', with the spot welding gun 2 opened, to be moved closer to the workpieces 3, 3' than in the event of thicker workpieces 3, 3'. A simple and manual adjustment of the path compensation is thus provided on the compensation element 16, since the electrodes 11, 11' will always cover a defined path to the respective workpiece 3, 3' and the pressure build-up of the electrodes 11, 11' on the workpieces 3, 3' will, hence, be started at a desired point of time, i.e. at the defined angle 22 of the bearing assembly 17 to the upper dead center 19, as is described and schematically illustrated in FIG. 3.

The perforated disc 44 can be fixed by the aid of a pin 51 after having reached the desired position according to a desired marking. Opposite the perforated disc 44, a clamping device 52 may, moreover, be arranged on the eccentric shaft 29, said clamping device being comprised of a clamping element 53, for instance a spring, and a clamping means 54.

The clamping means 54 is connected with the eccentric shaft 29 by the aid of a screw connection 55.

In order to adjust the perforated disc 44, the latter must be pulled by the user in the direction of the user so as to enable a release of the perforated disc 44 from the pin 51. After having rotated the perforated disc 44 into the desired position, the perforated disc 44 snaps into the pin(s) 51 due to the clamping device 52 in order to maintain its position.

This configuration provides for a simple and cost-effective pressure compensation, for which the user, prior to the spot-welding procedure, merely has to adjust the thickness of the workpieces 3, 3' to be welded.

FIGS. 11 to 14 illustrate different variant embodiments of the spur wheel 4 with the connecting rod 5 arranged thereon. In FIGS. 11 and 12, the connecting rod 5 is provided at a defined distance from the central axis 15 of the spur wheel 4, as described in FIGS. 1 to 4. The connecting rod 5 is connected with the spur wheel 4 via the bearing assembly 17. By rotating the spur wheel 4, the bearing assembly 17 is moved on along a radius relative to the central axis 15, which radius results from the distance of the bearing assembly 17 to the central axis 15, and the connecting rod 5', due to its fixation to the gun arm 6' (not illustrated), performs a rotating-lifting movement.

In FIGS. 13 and 14, another variant embodiment is illustrated, in which the connecting rod 5 is guided along guides 56 in the direction of the gun arm 6' (not illustrated). The spur wheel 4 has a curvilinear guideway 57, in which the connecting rod 5 and, in particular, the bearing assembly 17 is engaged. The guideway 57 in this exemplary embodiment is of circular shape and eccentrically arranged to the central axis 15. It should basically be noted that any other design or shape of the guideway 57, for instance elliptical, would be feasible too. Due to the guideway 57, the connecting rod 5 will be moved up and down at a rotation of the spur wheel 4 along the guide 56. Due to the configuration of the spot welding gun 2 illustrated in FIGS. 1 to 4, the electrodes 11, 11' are, thus, pressed in the direction of the workpieces 3, 3'. The nearer the connecting rod 5 to the central axis 15 of the spur wheel 4, the larger the extent of opening of the spot welding gun 2. Hence results the opening and closing movement of the spot welding gun 2.

A drive 1 for the spot welding gun 2 is, thus, provided in a simple manner. The drive illustrated in FIGS. 13 and 14 is again constructed such that the more the bearing assembly 17 approaches the upper dead center 19, the less force will be required to reach a defined application pressure of the electrodes 11, 11' on the workpieces 3, 3'. Thus, the drive 1 and, in particular, the displacement path of the spur wheel 4 in this exemplary embodiment too are controlled in a manner as to require as little force as possible to realize the pressure build-up, thus again enabling the use of only a small and low-output and, hence, also cheap motor, or appropriate motor-gear combination 13, as compared to current systems or drives.

The invention claimed is:

1. A spot welding gun for resistance-welding of workpieces, comprising:
    (a) first and second welding gun arms having first and second electrodes, respectively;
    (b) a drive for moving the welding gun arms, said drive comprising a spur wheel, a connecting rod, and a bearing assembly connecting the connecting rod with the spur wheel outside a central axis of the spur wheel; and
    (c) an element arranged between the connecting rod and the second welding gun arm to compensate for different thicknesses of the workpieces to be welded, said element comprising a casing including an eccentric shaft movably mounted in a bearing, as well as a blocking device;

wherein the spur wheel is connected to the first welding gun arm on a first side of the spur wheel and the connecting rod is connected with the second welding gun arm on a second side of the spur wheel opposite the first side;

wherein the compensation element allows the spur wheel to rotate without further building up pressure of the first and second electrodes on the workpieces in that the eccentric shaft is rotated about an axis after contact of the first and second welding gun arms with the workpieces without the second welding gun arm being caused to move; and wherein the bearing assembly performs a curvilinear movement during operation.

2. The spot welding gun according to claim 1, wherein a toothing is provided about the circumference of the spur wheel, which is engaged by a toothed wheel coupled to at least one of a gear and a motor.

3. The spot welding gun according to claim 1, wherein the compensation element is arranged on one of the first and second welding gun arms.

4. The spot welding gun according to claim 1, wherein a first pivot arm is arranged on the first welding gun arm, a second pivot arm is arranged on the second welding gun arm, and the first and second pivot arms are connected with each other on the sides opposite the first and second welding gun arms by a pin having an axis of rotation.

5. The spot welding gun according to claim 4, wherein the first welding gun arm carries the first electrode, the second welding gun arm carries the second electrode, and the first and second pivot arms are each arranged at a defined distance relative to at least one of the drive and the first and second electrodes.

6. The spot welding gun according to claim 1, wherein the compensation element is rigidly arranged on the second welding gun arm.

7. The spot welding gun according to claim 1, wherein the blocking device is designed to block the eccentric shaft, beginning from a defined rotation of the eccentric shaft.

8. The spot welding gun according to claim 1, wherein the blocking device is arranged on the casing of the compensation element and comprises a cylindrical projection, and wherein the eccentric shaft is inserted in a passage opening of the cylindrical projection.

9. The spot welding gun according to claim 8, wherein a fixing device is arranged on the eccentric shaft to connect the eccentric shaft with the blocking device.

10. The spot welding gun according to claim 8, wherein a readjusting element is arranged on the projection.

11. The spot welding gun according to claim 10, wherein said readjusting element is designed as a spring.

12. The spot welding gun according to claim 10, wherein the readjusting element is biased between two holding pins.

13. The spot welding gun according to claim 1, wherein the connecting rod of the drive is mounted on the eccentric shaft.

14. The spot welding gun according to claim 1, wherein the blocking device is designed as a magnetic brake.

15. The spot welding gun according to claim 1, wherein the compensation element is manually adjustable.

16. A method for adjusting pressure of a spot welding gun comprising the steps of:

(a) moving by a drive at least one electrode of a welding gun arm toward workpieces to be joined;

(b) actuating the welding gun arm by the drive via a spur wheel and a connecting rod mounted on the spur wheel;

(c) contacting the at least one electrode with the workpieces;

(d) further actuating the drive, after the at least one electrode has contacted the workpieces, to build up a pressure on the workpieces via the welding gun arm and the at least one electrode;

(e) detecting the pressure by a sensor and transmitting data of the sensor to a control device;

(f) after attainment of a predetermined pressure value of the at least one electrode on the workpieces, rotating the spur wheel further without building up the pressure in that an eccentric shaft of a compensation element arranged between the connecting rod and the welding gun arm is rotated about an axis by the spur wheel without the welding gun arm being caused to move;

(g) carrying out spot welding; and (h) after spot welding has been completed moving the at least one electrode back;

wherein the compensation element is blocked when reaching a defined position to effect a further pressure build-up of the at least one electrode on the workpieces.

17. The method according to claim 16, wherein the sensor detects the position of at least one of the spur wheel and the motor in order to block the compensation element.

18. The method according to claim 16, wherein the compensation element is mechanically constructed and blocked from any further pressure build-up when reaching a mechanically fixable position.

19. The method according to claim 16, wherein, prior to beginning a spot welding procedure, the spot welding gun is opened and a reference position of the spur wheel is determined via the sensor.

20. The method according to claim 16, wherein the blocking of the compensation element occurs after the spur wheel rotates without building up the pressure, the blocking occurring in that the eccentric shaft is blocked in a direction of rotation of the eccentric shaft when reaching a spur-wheel defined position of the spur wheel.

21. The method according to claim 16, wherein the pressure is also detected by a pressure recognition device arranged on at least one of the connecting rod and the welding gun arm.

22. The method according to claim 21, wherein the pressure is detected via deformation of at least one of the connecting rod and the welding gun arm.

* * * * *